United States Patent
Cohn et al.

(10) Patent No.: US 10,796,338 B2
(45) Date of Patent: Oct. 6, 2020

(54) REAL-TIME TRACKING OF OFFLINE TRANSACTIONS

(71) Applicant: Facebook, Inc., Menlo Park, CA (US)

(72) Inventors: Yair Cohn, London (GB); Sebastian Hollington, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 409 days.

(21) Appl. No.: 15/170,354

(22) Filed: Jun. 1, 2016

(65) Prior Publication Data

US 2017/0352055 A1  Dec. 7, 2017

(51) Int. Cl.
| | | |
|---|---|---|
| *G06Q 30/00* | (2012.01) | |
| *G06Q 30/02* | (2012.01) | |
| *G06F 16/25* | (2019.01) | |
| *G06F 16/23* | (2019.01) | |

(52) U.S. Cl.
CPC ..... *G06Q 30/0255* (2013.01); *G06F 16/2379* (2019.01); *G06F 16/258* (2019.01); *G06Q 30/0269* (2013.01); *G06Q 30/0275* (2013.01)

(58) Field of Classification Search
CPC . G06Q 30/0277; G06Q 30/0269; G06Q 30/02
See application file for complete search history.

(56) References Cited

U.S. PATENT DOCUMENTS

| | | | | |
|---|---|---|---|---|
| 2006/0291404 A1* | 12/2006 | Thubert | ................. | H04L 45/00 370/254 |
| 2009/0216616 A1* | 8/2009 | Wang | ................. | G06Q 30/0254 705/14.53 |
| 2010/0082629 A1* | 4/2010 | Davis | ................. | G06F 16/24575 707/741 |
| 2010/0138294 A1* | 6/2010 | Bussmann | ............. | G06Q 40/04 705/14.49 |
| 2010/0262456 A1* | 10/2010 | Feng | ................. | G06Q 30/0229 705/14.3 |
| 2011/0087603 A1* | 4/2011 | Garcia | ................. | G06F 16/9577 705/55 |
| 2011/0153387 A1* | 6/2011 | Ma | ........................ | G06Q 30/02 705/7.32 |
| 2011/0153426 A1* | 6/2011 | Reddy | ................. | G06Q 30/0261 705/14.58 |

(Continued)

OTHER PUBLICATIONS

Chatwin; An overview of computational challenges in online advertising; 2013 ACC; pp. 5990-6007; 2013.*

(Continued)

*Primary Examiner* — Radu Andrei

(57) ABSTRACT

An online system receives offline conversion data in real-time from a third party system regarding an offline user, the offline conversion data indicating an action performed by the offline user and identifying information for the offline user. The online system identifies a local user matching the offline user based on the identifying information for the offline user. The online system stores the offline conversion for the identified local user. The online system determines an attribution to a sponsored content item for the offline conversion. The online system presents updated information regarding the offline conversion to the third party system in real-time.

15 Claims, 3 Drawing Sheets

(56) References Cited

U.S. PATENT DOCUMENTS

| | | | | |
|---|---|---|---|---|
| 2011/0225035 A1* | 9/2011 | Patwa | G06Q 30/02 705/14.41 |
| 2011/0231239 A1* | 9/2011 | Burt | G06Q 30/02 705/14.41 |
| 2011/0282725 A1* | 11/2011 | Chatterjee | G06Q 30/02 705/14.24 |
| 2011/0302025 A1* | 12/2011 | Hsiao | G06Q 30/0283 705/14.42 |
| 2012/0072280 A1* | 3/2012 | Lin | G06Q 30/0246 705/14.45 |
| 2013/0204700 A1* | 8/2013 | Synett | G06Q 30/0255 705/14.53 |
| 2014/0172541 A1* | 6/2014 | Bruich | G06Q 50/01 705/14.43 |
| 2015/0142551 A1* | 5/2015 | Papakipos | G06Q 30/0272 705/14.41 |
| 2015/0161658 A1* | 6/2015 | Little | G06Q 30/0246 705/14.45 |
| 2015/0262221 A1* | 9/2015 | Nakano | G06Q 30/0275 705/14.45 |
| 2015/0348094 A1* | 12/2015 | Ferber | G06Q 30/0267 705/14.45 |
| 2015/0348119 A1* | 12/2015 | Ferber | H04L 67/22 705/14.45 |
| 2016/0140603 A1* | 5/2016 | Kawamura | G06Q 30/0245 705/14.44 |
| 2016/0328739 A1* | 11/2016 | Synett | G06Q 30/0202 |
| 2017/0109760 A1* | 4/2017 | Cumberland | G06Q 30/0201 |
| 2017/0262880 A1* | 9/2017 | Cook | H04W 4/023 |
| 2018/0357678 A1* | 12/2018 | Diorio | G06Q 30/0275 |

OTHER PUBLICATIONS

Chen; In-Depth Survey of Digital Advertising Technologies; IEEE 2016; pp. 2124-2148; 2016.*

* cited by examiner

REAL-TIME TRACKING OF OFFLINE TRANSACTIONS

BACKGROUND

This disclosure relates generally to online systems, and in particular to real-time tracking of offline transactions.

Certain online systems, such as social networking systems, allow their users to connect to and to communicate with other online system users. Users may create profiles on such an online system that are tied to their identities and include information about the users, such as interests and demographic information. The users may be individuals or entities such as corporations or charities. Because of the increasing popularity of these types of online systems and the increasing amount of user-specific information maintained by such online systems, an online system provides an ideal forum for third parties to increase awareness about products or services to online system users.

In some cases, after a target user is presented with information by the online system regarding a third party system's products, services, or other information, the online system may subsequently be able to track if the target user acts upon such information. For example, the target user may perform the action on the website of the third party system. This website includes a tracking mechanism linked with the online system that allows the online system to directly track the subsequent action. By tracking the subsequent actions performed by users after being presented with information from the third party systems, the online system is able to provide the third party system with accurate information regarding the effectiveness of providing the information to the target users. However, in some cases, a target user who is presented by the online system with information about products or services at the online system may subsequently act upon this information offline, or in such a way that the subsequent action is not directly trackable. As the subsequent action is not directly trackable, the online system may not be able to provide accurate information to the third party system regarding the effectiveness of the information presented by the online system.

SUMMARY

Embodiments of the invention include an online system that may track offline transactions and other actions from third party systems in real time. The online system receives information about actions performed by users at the online system that may not be directly trackable, such as a transaction made at a physical location. This is in contrast to actions that may be directly trackable, such as one made at a website of the third party system. By using such a method, the online system is able to more accurately determine the effects of providing sponsored content from the third party systems and the benefits provided to the third party systems by the sponsored content. While previously the offline conversion information may not be accurately determined, and thus a large portion of the effect of the sponsored content may not be measured accurately, by having the offline conversions information be gathered and reported in real-time, the online system is able to more accurately present the information to the third party system, allowing the third party system to better understand the effects of its sponsored content.

In particular, in an embodiment, the online system receives offline conversion data from a third party system for an offline user, the offline conversion data including an indication of an action performed by the offline user that is not directly trackable and identifying information for the offline user, the offline conversion data received substantially immediately after the action. In one embodiment, the online system receives the offline conversion data via an application programming interface provided by the online system to the third party system. In one embodiment, the action is not directly trackable by the online system via a website of the third party system. In one embodiment, the action comprises at least one of: a transaction at a physical location, a transaction as part of a delayed payment service, a transaction as part of a service approval process, and a transaction completed at an intermediary. For example, the action could be a completion of a transaction that was started online, where a product or good was selected online, and payment for the good was made at a physical location.

The online system identifies a local user matching the offline user based on the identifying information for the offline user. In one embodiment, the online system identifies a local user having a threshold number of identifiers matching the corresponding identifiers in the identifying information of the offline user.

The online system stores the offline conversion for the identified local user, and determines a sponsored content item of the third party system to which the offline conversion can be attributed based on the action indicated in the offline conversion data performed by the local user in response to being presented with the determined sponsored content item. In one embodiment, the online system identifies a most recent sponsored content item that was presented within a range of a previous number of days to the identified local user during an impression opportunity, and identifies the most recent sponsored content item as the sponsored content item to be attributed to the offline conversion.

The online system transmits additional information regarding the offline conversion to the third party system, the additional information not previously accessible to the third party system. In one embodiment, the online system transmits to the third party system a conversion rate of the sponsored content based on a number of local users with stored offline conversion data attributed to the sponsored content item and a total number of local users presented with the sponsored content item.

In one embodiment, the conversion rate is further divided based on the type of action performed by local users as indicated the stored offline conversion data. In one embodiment, the conversion rate is further divided based on the visual placement of the attributed sponsored content item when the sponsored content item was presented to the local users in the online system.

In one embodiment, the online system determines an updated bid value for the sponsored content item based on the attribution, the updated bid value increased based on a value provided to the third party system by the offline conversion.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
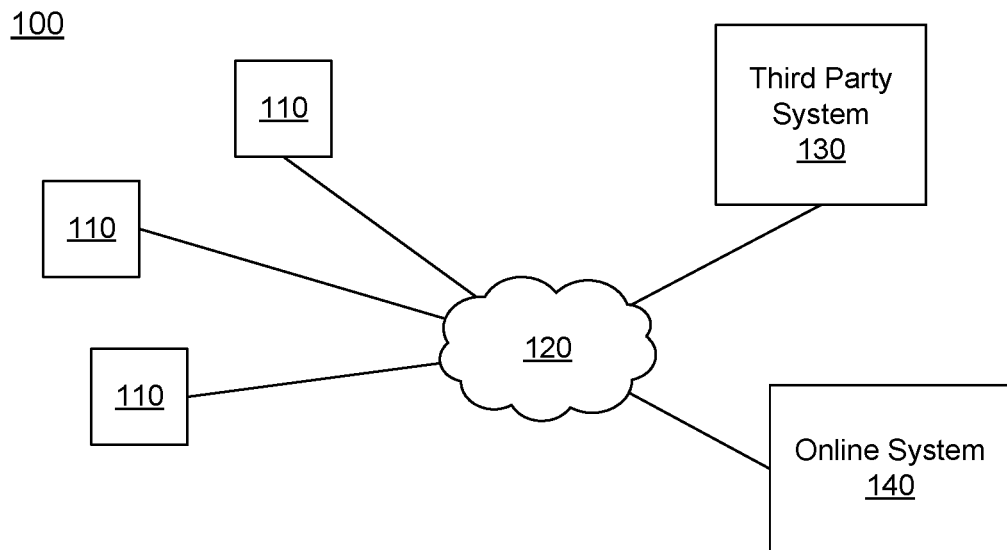
FIG. 1 is a high level block diagram of a system environment for an online system, according to an embodiment.

FIG. 1 is a high level block diagram of a system environment 100 for an online system 140 that is able to track offline transactions in real-time, according to an embodiment. The system environment 100 shown by FIG. 1 comprises one or more client devices 110, a network 120, one or more third-party systems 130, and the online system 140. In alternative configurations, different and/or additional components may be included in the system environment 100. In one embodiment, the online system 140 is a social networking system.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130, such as a sponsored content provider system, may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party website 130. Specifically, in one embodiment, a third party system 130 communicates sponsored content, such as advertisements, to the online system 140 for display to users of the client devices 110. The sponsored content may be created by the entity that owns the third party system 130. Such an entity may be an advertiser or a company producing a product, service, message, or something else that the company wishes to promote.

For example, a third party system 130 may be an entity, such as a retailer, with physical locations. These might provide goods or services for which the entity has provided information about via the online system 140. As another example, the third party system 130 may be a services provider, such as a bank that issues credit cards, which use the online system 140 to provide users with information regarding a type of service, such as a credit card, and may invite those users to apply or use the services.

Figure 2:
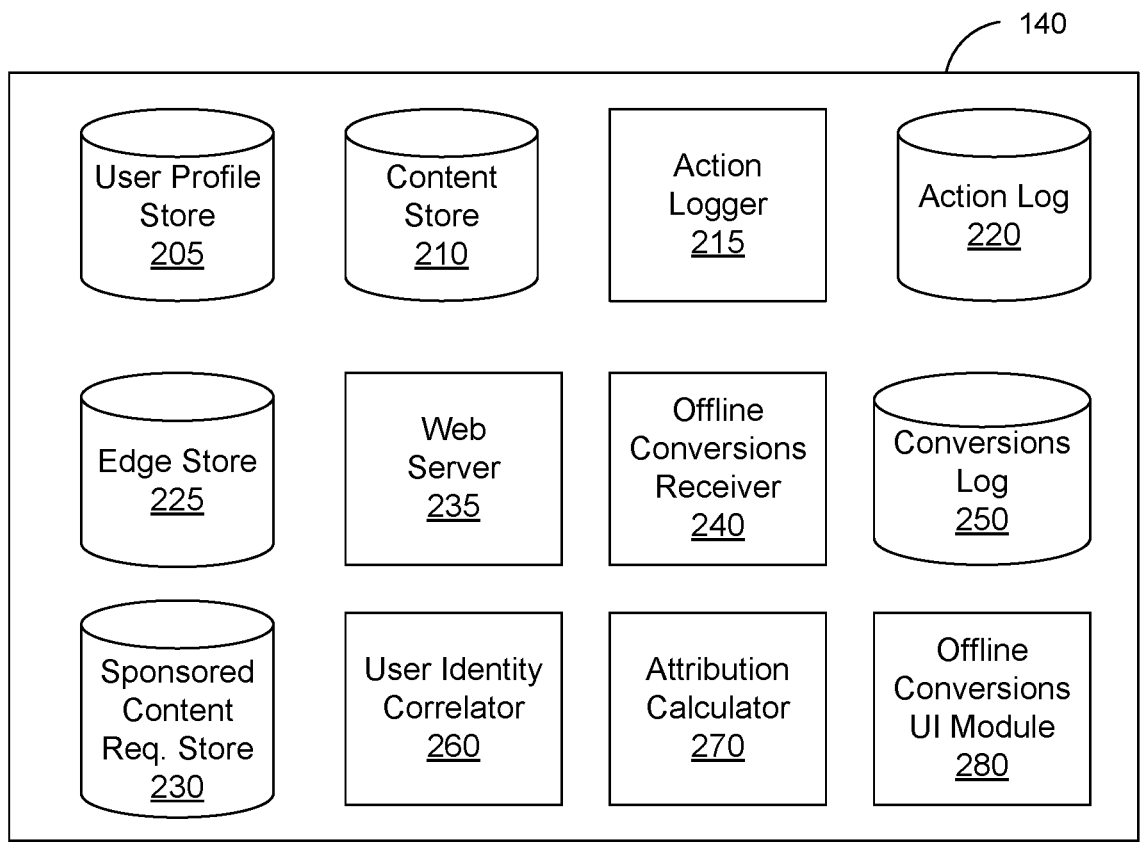
FIG. 2 is an example block diagram of an architecture of the online system 140, according to an embodiment.

FIG. 2 is an example block diagram of an architecture of the online system 140, according to an embodiment. The online system 140 shown in FIG. 2 includes a user profile store 205, a content store 210, an action logger 215, an action log 220, an edge store 225, a sponsored content request store 230, a web server 235, an offline conversions receiver 240, a conversions log 250, a user identity correlator 260, an attribution calculator 270 and an offline conversions user interface (UI) module 280. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, groups or applications. In some embodiments, objects are received from third-party applications or third-party applications separate from the online system 140. In one embodiment, objects in the content store 210 represent single pieces of content, or content "items." Hence, users of the online system 140 are encouraged to communicate with each other by posting text and content items of various types of media through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website that primarily sells sporting equipment at bargain prices may recognize a user of an online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The sponsored content request store 230 stores one or more sponsored content requests. Sponsored content is content that an entity (i.e., a sponsored content provider) presents to users of an online system and allows the sponsored content provider to gain public attention for products, services, opinions, causes, or messages and to persuade online system users to take an action regarding the entity's products, services, opinions, or causes. In one embodiment, a sponsored content item is an advertisement, and the sponsored content request store 230 stores advertisement requests ("ad requests"). An ad request includes advertisement content, also referred to as an "advertisement" and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an ad request by an advertiser (who may be the entity providing the sponsored content) and is used to determine an expected value, such as monetary compensation, provided by an advertiser to the online system 140 if advertisement content in the ad request is presented to a user, if the advertisement content in the ad request receives a user interaction when presented, or if any suitable condition is satisfied when advertisement content in the ad request is presented to a user. For example, the bid amount specifies or is used to compute a monetary amount that the online system 140 receives from the advertiser if advertisement content in an ad request is displayed. In some embodiments, the expected value to the online system 140 of presenting the advertisement content may be determined by multiplying the bid amount by a probability of the advertisement content being accessed by a user.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with advertisement content from an advertisement request. As another example, targeting criteria identifies users having a connection to another user or object or having a particular type of connection to another user or object.

The web server 235 links the online system 140 via the network 120 to the one or more client devices 110, as well as to the one or more third party systems 130. The web server 235 serves web pages, as well as other web-related content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 235 may provide application programming interface (API) functionality to send data directly to native client device operating systems, such as IOS®, ANDROID™, WEBOS® or RIM®.

Figure 4:
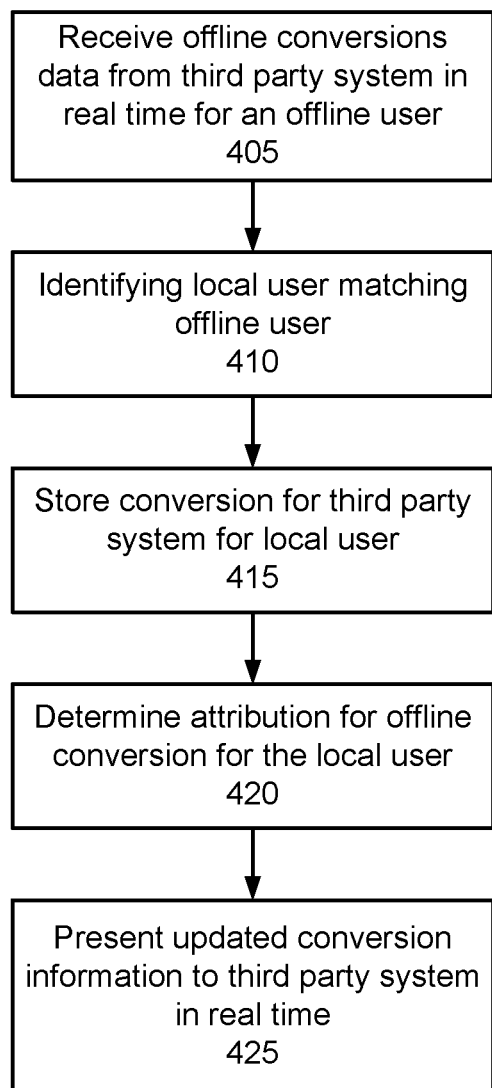
FIG. 4 is a flowchart of one embodiment of a method in an online system for logging offline conversions in real-time.

The offline conversions receiver 240 receives, e.g., as in step 405 of FIG. 4, offline conversions information from the third party systems 130. As used here, offline conversions refers to actions, such as transactions, performed by users with regards to the third party systems 130 but which are not directly trackable by the online system 140. These actions performed by users may provide some benefit to the third party system 130, i.e., the actions provide a value (e.g., an increase in revenue, a desired action) to the third party system 130, and may be performed in response to being presented with content (e.g., sponsored content) from the third party system 130 at the online system 140. The action may not be directly trackable by the online system 140 because the action is performed in a scenario where the performance of the action does not result in an immediate message or other data being sent to the online system 140. As an example, in a trackable case, the action performed may be a purchase at the website of the third party system 130. When the user (i.e., the client device 110 of the user) requests the web page where the purchase is completed (e.g., an order confirmation page), the web page may include a tracking pixel or other mechanism that transmits a message to the online system 140 indicating that the action was performed.

However, in the case of an action that is not directly trackable, such automated means of tracking the action performed (e.g., via a website) is not available. Examples of such actions may include completing a transaction at a physical retail location, completing a transaction made online at a physical location (e.g., a convenience store), successfully accepting a services transaction (e.g., a credit card application) after a user has initiated the transaction, completing a transaction at an intermediary not directly linked to the third party system 130 (e.g., a marketplace website).

In these and other similar cases, the offline conversions receiver 240 may provide a separate method for the third party system 130 to transmit information regarding these offline conversions to the online system 140.

The offline conversions receiver 240 may provide the third party system 130 with a variety of options to transmit the offline conversions data. For example, the offline conversions receiver 240 may provide an application programming interface (API), user interface, standard file format definition, or other option(s) to the third party system 130 to allow the third party system 130 to transmit the offline conversions data to the online system 130 to be received by the offline conversions receiver 240. In one embodiment, the options provided to the third party system 130 allow the third party system 130 to send the offline conversions data in real-time, i.e., as the actions of the offline conversions are completed, or immediately after the third party system 130 considers the actions to be completed (e.g., in the case of an action such as retail purchase, the action may be completed once a grace/return period is ended). Each use of the term "real-time" herein means as an action happens or substantially immediately thereafter. However, in alternative embodiments, the offline conversions receiver 240 may also receive the information in batch (e.g., at a later time, or periodically, but not necessarily in real time).

For each offline conversion, the offline conversions receiver 240 may receive from a third party system 130 an indication of the type of action performed, the identity of the offline user (which may be hashed or non-hashed, and may include personally identifiable or non-personally identifiable information), the timestamp of the action, and other metadata such as the revenue/profit generated by the action, a value score of the action to the third party system 130, and so on. The offline conversions receiver 240 may store this offline conversions information in the conversions log 250.

The user identity correlator 260 identifies, e.g., as in step 410 of FIG. 4, the local user of the online system 140 corresponding to an offline user identified in an instance of offline conversions data received from the third party system 130 regarding a particular action performed by the offline user. Each entry of the offline conversions data may identify an offline user that performed the action indicated in the offline conversions data. The user identity correlator 260 determines whether this identified offline user is the same as a local user of the online system 140, and if so, indicates the association or correlation between the matched local user and the identified offline user.

The online system 140 may receive from the third party system 130 various identifiers for the offline user, and depending on the third party system 130, these identifiers may be different, and include more or less information. The identifiers may also be hashed to prevent leakage of personally identifiable information (i.e., the received information is hashed so that the online system 140 only knows the identity of the offline user if the hash matches a hash of the same identifiers for a local user).

The user identity correlator 260 searches the local users of the online system 140 (e.g., users in the user profile store 205) to determine whether a local user exists that matches the information provided for the offline user. The user identity correlator 260 may attempt to match the identifiers provided for the offline user with the local users of the online system 140 until a match is found where all (or a percentage) of the information provided for the offline user matches the information of the local user. The user identity correlator 260 may assign a confidence score or measure of accuracy indicating the reliability of the match, i.e., whether the match is a true match or whether the local user may not actually be the same as the offline user. Subsequently, only those matches with scores above a threshold value may be considered for use in determining attribution and conversion rates. In other words, not all the information provided for the offline user may have to completely match a local user for a match to be positive.

Additional details regarding matching local users with identifiers of users provided by third party systems are described in U.S. Pat. Pub. No. 2014/0257999, filed Mar. 7, 2013, U.S. Pat. Pub. No. 2013/0138569, filed Nov. 29, 2011, and U.S. Pat. Pub. No. 2016/0078134, filed Sep. 16, 2014, all of which are incorporated by reference herein in their entirety.

Once the user identity correlator 260 determines that a local user matches an offline user, the user identity correlator 260 may store the association in the conversions log 250 for the corresponding offline conversions data entry, e.g., as in step 415 of FIG. 4. The user identity correlator 260 may perform the above matching operations in real time as the offline conversions data is received from the third party systems 130.

The conversions log 250 stores the offline conversions information received by the offline conversions receiver 240. For each third party system 130, the conversions log 250 may store separate offline conversions information. For example, each entry in the conversions log may correspond to one offline conversion event and may include indications of the third party system 130, the action performed (e.g., retail purchase, credit application approved, etc.), a timestamp for the action, identifying information for the offline user that performed the action, an indication of the local user that matches the offline user, and any other metadata related to the entry, such as revenue generated, a value score of the action to the third party system 130, and so on. This data may later be used to determine the attribution for the offline conversion, as well as the conversion rate of users presented with a particular piece of content from the third party system, among other information. The conversion rate for a particular content from a third party system 130 refers to the rate at which users perform actions, both directly trackable and not directly trackable, after being presented with the particular content (e.g., sponsored content).

The attributions calculator 270 computes the attribution of a sponsored content item presented to the local users of the online system 140 in causing the actions indicated in the offline conversions data. The attribution of a sponsored content item to an offline conversion indicates the sponsored content has most likely contributed to the local user performing the action in the offline conversion. In other words, the attribution indicates which sponsored content, if any, presented to a local user is most correlated with the local user performing the action. In some cases, each action may also be attributed to multiple prior presentations of sponsored content (which may have been presented on different types of devices, and may have been reacted to differently by users). If multiple prior presentations are attributed, each presentation may receive an attribution value indicating the portion of the attribution allocated to that presentation.

By receiving the data for the offline conversions for a third party system 130 in real-time (or near real-time), the attributions calculator 270 is able to determine the attribution effects of the offline conversion and update future estimated bid values for content from the same third party system 130, as well as present the attribution information to the third party system 130.

For each third party system 130, and for each sponsored content that the third party system 130 may have requested the online system 140 to present to local users, the attributions calculator 270 may determine, e.g., as in step 420 of FIG. 4, an attribution value for the sponsored content indicating the attribution for that sponsored content in causing the action by an offline user (that is matched to a local user). The attributions calculator 270 retrieves the information regarding the third party system 130 from the conversions log 250 indicating the offline conversions for the third party system 130. The attributions calculator 270 also retrieves the information regarding the presentation of sponsored content from the third party system 130 to local users of the online system 140. This information may be stored in the action log 220.

Using this information, the attributions calculator 270 may determine (in real-time or periodically) which presentations of the sponsored content should be attributed to each offline conversion entry retrieved from the conversions log 250 for the third party system. The attributions calculator 270 may identify the most recent sponsored content from the corresponding third party system 130 that was presented in an impression opportunity (e.g., up to 28 days back) to a local user indicated in an offline conversion entry. The attributions calculator may then attribute the offline conversion to that most recent sponsored content. Alternatively, the attributions calculator 270 may attribute the offline conversion to multiple presentations of sponsored content from the third party system 130 in a time-weighted fashion such that the most recently presented sponsored content receives a higher attribution percentage (e.g., a multi-touch attribution). For example, the attribution percentage of a sponsored content item may decrease inversely as a square of the time difference between the presentation of the sponsored content and the occurrence of the offline conversion.

The attributions calculator 270 may also maintain separate attribution information depending upon the type of response the offline user made against the sponsored content. The offline user may have only viewed the sponsored content, or may have clicked on it, posted about it, commented about it, and so on. The attributions calculator 270 may indicate with each attribution which one of these types of responses was made by the offline user.

The attributions calculator 270 may also compute an updated bid value based on the offline conversions data. The attribution information that is computed as described above allows the attributions calculator 270 to determine which types of sponsored content, presented at which points in time, on which client devices (e.g., mobile vs desktop), to which users (with certain characteristics), produce the highest chances, or highest value, in offline conversions. The attributions calculator 270 may modify the bid values for these sponsored content items when an impression opportunity arises for a local user. The attributions calculator 270 may increase the bid value when presenting the sponsored content for the third party system 130 is favorable, and may decrease the bid value if not favorable. For example, the attributions calculator 270 may determine that local users in a particular geographic region are highly likely to perform an offline conversion due to presentation of a particular sponsored content from a third party system 130, as shown by the computed attribution data. The attributions calculator 270 may increase the bid value (up to a maximum that may be specified by the third party system 130) for that sponsored content to increase the chances of winning the bid.

The increased bid value may be determined by the attributions calculator 270 based on a computation of the number of presentations of the sponsored content for every offline conversion, i.e., the conversion rate. As the offline conversion brings in a certain amount of value or profit (e.g., a retail store purchase brings in a profit), and as the bid costs money, the attributions calculator 270 may determine a bid value such that on average, a certain profit margin is maintained in consideration of these factors. The attributions calculator 270 may further determine a separate bid value for each type of response (e.g., view only, click, etc.) made by a user against a sponsored content item in a similar fashion.

In some cases, when determining the conversion rate, the attributions calculator 270 may account for reversed actions as indicated the third party system 130 in the offline conversions data. A reversed action may occur when a transaction is reversed, such as in the case of a refund. The reversed action may count as negative and decrease the conversion rate.

Additional details regarding determining attribution may be found in U.S. Pat. Pub. No. 2016/0027040, filed Jul. 25, 2014, and which is hereby incorporated by reference in its entirety.

In other embodiments, the online system 140 uses the offline conversions data (with matched local user information) to generate targeting clusters of users. These targeting clusters of users may be used by the online system 140 to provide third party systems 130 with a group of users that are more likely to generate value for the third party system 130. Additional details regarding the generation of targeting clusters is described in U.S. Pat. Pub. No. 2015/0088663, filed Sep. 23, 2013, and U.S. Pat. Pub. No. 2015/0227977, filed Feb. 11, 2014, both of which are hereby incorporated by reference in their entirety.

The offline conversions user interface (UI) module 280 presents information about the offline conversions to the third party systems 130. The offline conversions UI module 280 may allow each third party system 130 to see the conversion rate of each sponsored content item provided by the third party system 130. In other words, the offline conversions UI module 280 may present to the third party system 130 the effectiveness of each sponsored content item. The offline conversions UI module 280 may compute the conversion rate by dividing the number of stored offline conversion entries for a sponsored content item by the total number of impressions of that sponsored content item. The offline conversions UI module 280 may also present to the third party system 130 information regarding the attributions for different types of offline conversions, i.e., which sponsored content causes which types of actions in the offline conversions, e.g., as described in step 420 of FIG. 4

The offline conversions UI module 280 may present to the third party system 130 regarding how the placement of the sponsored content (e.g., within a news feed, on a side bar, etc.) within the web page or other medium may affect the attribution and/or conversion rates for offline conversions. To compute a conversion rate for a sponsored content item, the offline conversions UI module 280 determines the number of presentations made for the sponsored content compared to the number of offline conversion events attributed to the same sponsored content.

The offline conversions UI module 280 may present to the third party system 130 an identifier of the client device on which the local user was presented with the sponsored content that is attributed to the offline conversion. The offline conversions UI module 280 may also indicate what portions (e.g., percentages) of the attributions were based on what type of response against the sponsored content item (e.g., view, click, etc.).

To present the information described above, the offline conversions UI module 280 may categorize each type of sponsored content, each presentation of the sponsored content, and so on, into separate bins, compute the statistics (e.g., conversion rate) separately for each bin, and present each bin separately to the third party system 130. For example, the offline conversions UI module 280 may bin the offline conversions associated with different placements of the same sponsored content separately, and present the statistics regarding these bins separately.

The offline conversions UI module 280 may also present details regarding each offline conversion, including the type of the offline conversion (e.g., retail purchase, deferred payment), the sponsored content attributed to it, as well as other details regarding the sponsored content and the offline conversion, such as those factors described above (e.g., content placement). As a result of this new information, the third party system 130 is able to see additional information regarding the effect of sponsored content presented to local users of the online system 140 for offline conversions.

Additional details regarding the system described above are presented below with regards to FIGS. 3-4.

As noted above, the system as described here has many advantages compared to a traditional method. Previously, a system may not have been easily able to determine the effects of offline conversions. At most, a system may have performed a simple lift analysis much later on, and after the fact, to determine in the aggregate an approximate effect on offline conversions. However, without being able to provide information regarding the effects of offline conversions in a timely fashion, the information is not significantly useful to a third party system 130.

Instead, as described here, by providing the information in (near) real-time, the third party systems 130 may quickly adjust for and react to the changes in user response to sponsored content. Furthermore, as described in further detail below, the receipt of offline conversions information allows for more accurate tracking of users' actions, based on an actual occurrence of the action, rather than an estimation or guess that the action may have occurred.

For example, in the case of deferred payments, a user may have reached a payment instruction web page requesting the user to remit payment to a particular bank account. If the online system 140 were to track the user's actions only up to this web page, the information gathered by the online system 140 may not be accurate, as many users may not actually transfer payment subsequently to the particular bank account. Instead, by receiving the offline conversion information regarding payments to the bank account from the third party system 130, the online system 140 is able to gather much more accurate information regarding user behavior, and pass this information back to the third party system 130.

Figure 3:
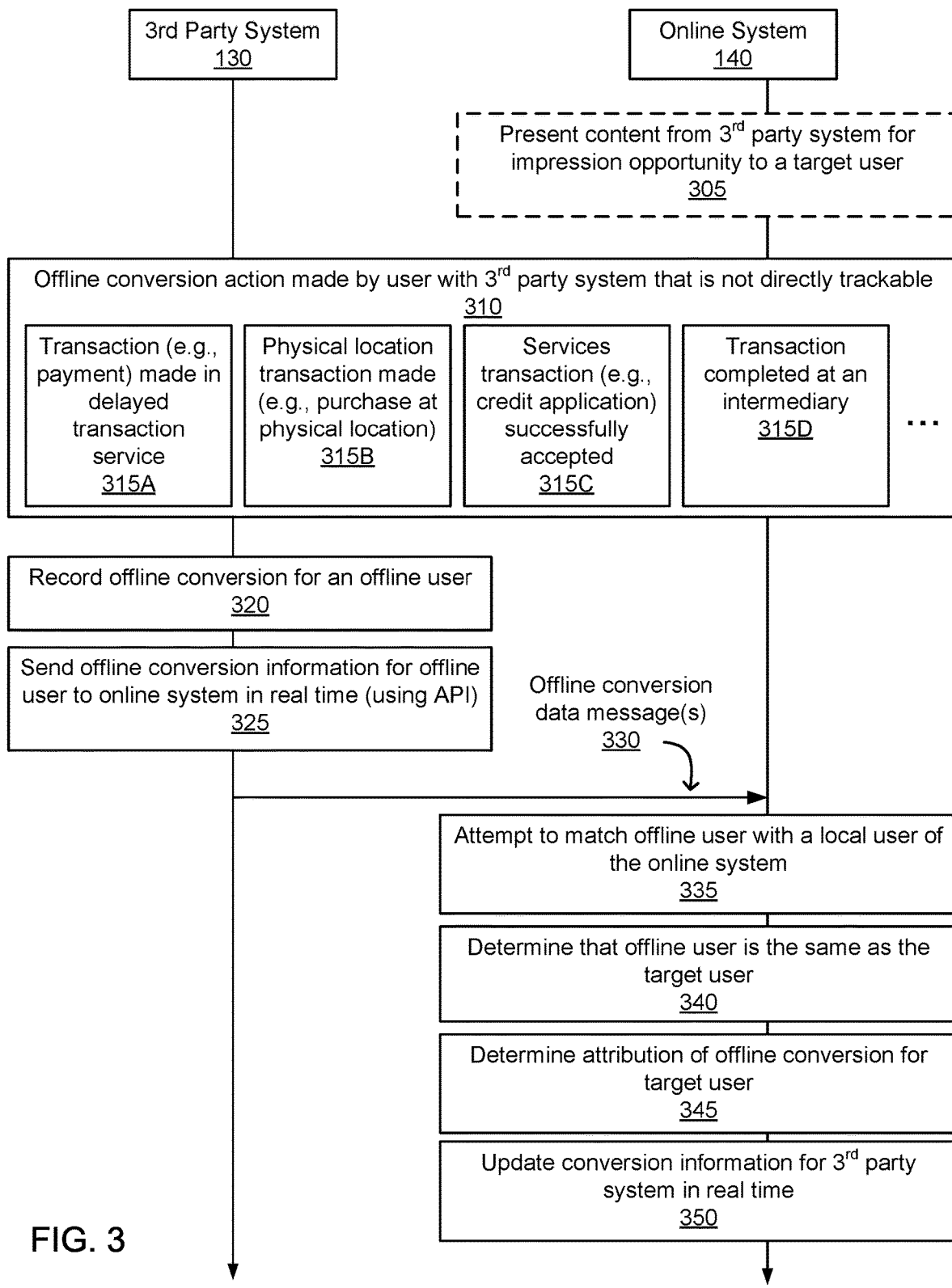
FIG. 3 is a transactional diagram illustrating an exemplary data flow between the third party system and the online system for the receipt and processing of offline conversion information in real-time.

Exemplary Transactional Diagram Illustrating the Receipt and Processing of Offline Conversion Information by an Online System FIG. 3 is a transactional diagram illustrating an exemplary data flow between the third party system 130 and the online system 140 for the receipt and processing of offline conversion information in real-time. Although certain elements are illustrated in FIG. 3, in other embodiments the elements may be different and the flow of the data through the elements may be different.

At some prior point in time, the online system 140 may have presented 305 content from the third party system in an impression opportunity to a target user, who is a local user of the online system 140. The target user may have responded to the content by viewing it, clicking on it, interacting with it, etc., as described above.

Subsequently, a user of the third party system 130 makes 310 an offline conversion. These offline conversions may include different types of actions which are not directly trackable, as described above. Some examples of these actions are presented in FIG. 3 and described below, however, such actions are not limited to these examples.

The action may be a transaction 315A made in a delayed transaction service. After viewing a sponsored content item, a target user may visit the website of a third party system 130 that supports a delayed payment service. Such a service allows a user to indicate a purchase for some goods or services online at the third party system 130. Subsequently, the third party system 130 provides the user the option to submit payment for the purchase through an offline means, at which point the transaction is completed and the goods or services is to be provided. For example, a target user may purchase an item at the website of a third party system 130. At the payment web page of the third party system 130, the target user is provided by the third party system 130 with the option to submit a payment offline. This might be by providing a bank wire transfer number, bank account number, by providing a payment certificate, or other identifier of an offline payment method. The target user may complete the transaction by submitting the payment offline, such as by sending the payment to the specified bank wire or account number, or bringing the payment certificate to a local bank or other physical merchant in the payment certificate network, and paying for the purchase at that point (e.g., handing over the payment certificate and purchase amount to a store clerk). Such offline payment methods would not be directly trackable.

The action may be a transaction 315B made at a physical location. After viewing a sponsored content item from the third party system 130 at the online system 140, the target user may visit a physical location (e.g., a physical retail store) of the third party system 130 and purchase an item at that location. For example, a sponsored content item presented to the target user may be of some clothing item or other product. The target user may wish to test or try the product at a physical store before purchasing it. Upon testing the item, the target user may purchase the item in store. Such physical transactions would not be directly trackable by the online system 140.

The action may be a services transaction 315C that is subsequently accepted. In some cases, a target user may be presented with sponsored content from the third party system 130 inviting the user to apply for or submit to an approval or other process before the transaction is considered complete. An example of this is for acquiring a credit card. A target user is requested to complete the credit card application and receive an approval before the transaction is completed and the user is issued a credit card. The approval of the user is an action that is not directly trackable either. Another example of such a transaction may be a periodic payment transaction, where the benefit to the third party system 130 is counted when a threshold number of payments have been made.

The action may be a transaction 315D performed at an intermediary. In some cases, the target user may not make the transaction at the third party system 130, but instead may transact the third party system's goods or services at an intermediary. For example, a target user may use a travel agency to book a ticket for an airliner, or may use a marketplace website to purchase a company's product. Such a transaction may not be directly trackable since the intermediary may not have a direct relationship with the online system 140, and so no tracking mechanism is implemented at the intermediary.

As described above, these offline conversions may be common occurrences, but cannot be directly (or easily) tracked using common means. Instead, as described above with regards to FIG. 2, the online system 140 may provide the third party system 130 with various tools (e.g., an API) to send the information regarding the offline conversions to the online system 140 to allow for real-time tracking of these offline conversions.

Thus, after the offline conversion occurs, the third party system 130 may record 320 the offline conversion for an offline user. This offline user is a user who performed a transaction or other action not directly trackable by the online system, and who may the same target user described above. Subsequently, the third party system 130 sends 325 the offline conversion information as a message(s) 330 to the online system 140 (which may be in real-time). The offline conversion information sent to the online system 140 may include a description of the action performed (e.g., a retail purchase), an identifier of the offline user (e.g., publicly available information, a unique identifier, a hash of a personally identifiable information, etc.), a timestamp of the when the action occurred, and possibly other metadata regarding the action, such as the dollar amount of any transactions, and so on.

The online system 140 (e.g., the offline conversions receiver 240) receives the message(s) 330 that have the offline conversion information (e.g., as described in step 405 of FIG. 4). Using the identifier of the offline user, the online system 140 (e.g., the user identity correlator 260) attempts to match 335 the offline user with a local user of the online system 140, as described above. The online system 140 may determine 340 may determine that the offline user matches the target user to whom content from the third party system 130 was previously presented (e.g., as described in step 410 of FIG. 4). Thus, the user who performed the action in the offline conversion is the same user to whom the online system 140 previously targeted to present a sponsored content item from the third party system 130. The online system 140 may store this association as well as the offline conversion information (e.g., as described in step 415 of FIG. 4).

The online system 140 (e.g., the attribution calculator 270) may then determine 345 the attribution of the offline conversion for the local user (e.g., as described in step 420 of FIG. 4). As described above, the online system 140 may determine the attribution by determining the most recent sponsored content item that was presented to the target user and attributing the offline conversion to the presentation of the recent sponsored content. The online system 140 may store this attribution information as well (e.g., in the conversions log 250).

The online system 140 may update 350 the conversion information for the third party system 130 in real-time based on the offline conversion information received from the third party system (e.g., as described in step 425 of FIG. 4). This may include presenting the updated conversion and attribution information to the third party system 130 via a UI, or by updating the bids for the sponsored content of the third party system 130 as described above. The online system 140 may also update the information through other means, such as an API.

Exemplary Flow of a Method of Logging Offline Conversions in Real-Time

FIG. 4 is a flowchart of one embodiment of a method in an online system for logging offline conversions in real-time. In other embodiments, the method may include different and/or additional steps than those described in conjunction with FIG. 4. Additionally, in some embodiments, the method may perform the steps described in conjunction with FIG. 4 in different orders. In one embodiment, the method is performed by one or more of the modules of the online system 140 described above.

The online system 140 (e.g., the offline conversions receiver 240) receives 405 offline conversions data from a third party system in real-time for an offline user. As noted, an offline user is a user who performed an action in an offline conversion, such as making a payment via a delayed payment service, making a purchase at a retail physical location, being approved for a services transaction, or making a purchase through an intermediary. The offline conversion refers to information about an action performed by a user, and which in some cases may be as a result of the user being presented with a sponsored content item from the third party system, and which is not directly trackable by the online system 140.

The online system 140 (e.g., the user identity correlator 260) identifies 410 a local user that matches the offline user using information from received offline conversion data. The offline conversions data may include information such as zip codes, phone number, and so on, that may be used to identify the offline user. As noted above, the online system 140 may attempt to match this information with the information it has about local users in order to find a match.

The online system 140 (e.g., the user identity correlator 260) stores 415 the offline conversion for the local user. Since the online system 140 was able to find a match with a local user, the online system 140 may store the offline conversion information locally (e.g., in the conversions log 250).

The online system 140 (e.g., the attribution calculator 270) determines 420 the attribution for the offline conversion for the local user. The online system 140 may look up prior presentations of sponsored content to the local user from the third party system associated with the offline conversion to determine whether the local user was presented with sponsored content from the third party system. If a presentation of sponsored content is found, the online system 140 may attribute the offline conversion to this presentation of sponsored content. As described above, the online system 140 may also modify the bid values of the sponsored content based on the attribution information.

The online system 140 (e.g., the offline conversions UI module 280) presents 425 the updated conversion information to the third party system in real-time. This updated conversion information is information that is not available to the third party system, or includes additional information about the offline conversions. As described above, this information may include various statistics regarding the attribution, conversion rates, metadata, and other information regarding the offline conversions, the local users who performed actions indicated in the offline conversions, the sponsored content attributed to the offline conversions, and so on. As the online system 140 may update this information in real-time (or near real-time), the third party system 130 (or an administrator of the third party system 130) can react quickly to a situation that may adversely affect the third party system 130.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    extending, by an online system, an application programming interface (API) for access by a third party system, the application, the API including one or more hypertext transport protocol (HTTP) based commands that allow the third party system to transmit offline conversions data to an online system, the offline conversion data including an indication of an action performed by an offline user that is not directly trackable;
    receiving, at the online system from the third party system, an HTTP message with a function call of the API, the function call including instructions to add offline conversion data for an offline user, the offline conversion data added to communications between the online system and the third party system and received in real-time as the actions of the offline conversions are completed, each entry of the received offline conversion data comprising at least one of the following identifying information: an indication of the third party system, an indication of a type of action performed by the offline user, a timestamp for the action, and metadata associated with revenue or profit generated by the action, a value score of the action to the third party system, wherein the identifying information for the offline user is hashed for security;
    identifying a local user matching the offline user by matching identifying information of the local user with the identifying information of the offline user received in offline conversion data entry from the API function call, wherein the matching is based on:
        assigning a confidence score to a match between the local user and the offline user, and
        determining whether the confidence score meets a predetermined threshold;
    storing, at the online system, the offline conversion data entry for the identified local user;
    identifying one or more sponsored content items of the third party system that were presented within a range of a previous time period to the identified local user during one or more impression opportunities at the online system;
    determining an attribution amount of the offline conversion for each of the one or more sponsored content items that is inversely proportional to the time between a timestamp of the impression opportunity of the sponsored content item and a timestamp of an occurrence of the offline conversion;
    computing an updated bid value for each of the one or more sponsored content items for the identified local user, the updated bid value increased or decreased based on the corresponding attribution amounts for that sponsored content item, the updated bid value computed by the online system when submitting the sponsored content item for impression opportunities for the identified local user; and
    transmitting computer readable instructions to a client device of the third party system to cause the client device of the third party system to display a user interface presenting additional information regarding the offline conversion to the third party system, the additional information including a conversion rate of the one or more sponsored content items computed using stored offline conversion data, the additional information not previously accessible to the third party system.

2. The method of claim 1, wherein the action is not directly trackable by the online system via a website of the third party system.

3. The method of claim 1, wherein the action comprises at least one of: a transaction at a physical location, a transaction as part of a delayed payment service, a transaction as part of a service approval process, and a transaction completed at an intermediary.

4. The method of claim 1, wherein the transmitting additional information regarding the offline conversion further comprises:
    transmitting to the third party system a conversion rate of the sponsored content based on a number of local users with stored offline conversion data attributed to the sponsored content item and a total number of local users presented with the sponsored content item.

5. The method of claim 4, wherein the conversion rate is further based on the type of action performed by offline users as indicated by the stored offline conversion data.

6. The method of claim 4, wherein the conversion rate is further based on the visual placement of the attributed sponsored content item when the sponsored content item was presented to the local users in the online system.

7. The method of claim 1, wherein the identifying the local user matching the offline user further comprises:

identifying a local user having a threshold number of identifiers matching the corresponding identifiers in the identifying information of the offline user.

8. A computer program product comprising a non-transitory computer readable storage medium having instructions encoded thereon that, when executed by a processor, cause the processor to:

extend, by an online system, an application programming interface (API) for access by a third party system, the application, the API including one or more hypertext transport protocol (HTTP) based commands that allow the third party system to transmit offline conversions data to an online system, the offline conversion data including an indication of an action performed by an offline user that is not directly trackable;

receive, at the online system from the third party system, an HTTP message with a function call of the API, the function call including instructions to add offline conversion data for an offline user, the offline conversion data added to communications between the online system and the third party system and received in real-time as the actions of the offline conversions are completed, each entry of the received offline conversion data comprising at least one of the following identifying information: an indication of the third party system, an indication of a type of action performed by the offline user, a timestamp for the action, and metadata associated with revenue or profit generated by the action, a value score of the action to the third party system, wherein the identifying information for the offline user is hashed for security;

identify a local user matching the offline user by matching identifying information of the local user with the hash of the identifying information of the offline user received in offline conversion data entry from the API function call, wherein the matching is based on:
  assigning a confidence score to a match between the local user and the offline user, and
  determining whether the confidence score meets a predetermined threshold;

store, at the online system, the offline conversion data entry for the identified local user;

identify one or more sponsored content items of the third party system that were presented within a range of a previous time period to the identified local user during one or more impression opportunities at the online system; and determine an attribution amount of the offline conversion for each of the one or more sponsored content items that is inversely proportional to the time between a timestamp of the impression opportunity of the sponsored content item and a timestamp of an occurrence of the offline conversion;

compute an updated bid value for each of the one or more sponsored content items for the identified local user, the updated bid value increased or decreased based on the corresponding attribution amounts for that sponsored content item, the updated bid value computed by the online system when submitting the sponsored content item for impression opportunities for the identified local user; and transmit computer readable instructions to a client device of the third party system to cause the client device of the third party system to display a user interface presenting additional information regarding the offline conversion to the third party system, the additional information including a conversion rate of the one or more sponsored content items computed using stored offline conversion data, the additional information not previously accessible to the third party system.

9. The non-transitory computer readable storage medium of claim 8,
wherein the action is not directly trackable by the online system via a website of the third party system.

10. The non-transitory computer readable storage medium of claim 8,
wherein the action comprises at least one of: a transaction at a physical location, a transaction as part of a delayed payment service, a transaction as part of a service approval process, and a transaction completed at an intermediary.

11. The non-transitory computer readable storage medium of claim 8, further comprising instructions that when executed by the processor cause the processor to:
transmit to the third party system a conversion rate of the sponsored content based on a number of local users with stored offline conversion data attributed to the sponsored content item and a total number of local users presented with the sponsored content item.

12. The non-transitory computer readable storage medium of claim 11 wherein the conversion rate is further based on the type of action performed by offline users as indicated the stored offline conversion data.

13. The non-transitory computer readable storage medium of claim 11 wherein the conversion rate is further based on the visual placement of the attributed sponsored content item when the sponsored content item was presented to the local users in the online system.

14. The non-transitory computer readable storage medium of claim 8,
having further instructions that when executed by the processor cause the processor to:
identify a local user having a threshold number of identifiers matching the corresponding identifiers in the identifying information of the offline user.

15. The method of claim 1, wherein the user interface presents a plurality of data bin user interfaces to the third party system, each data bin user interface presenting statistical information regarding an effect of one of a plurality of characteristics of a presentation of sponsored content on offline conversions, one of the characteristics of the plurality of characteristics including a placement position of sponsored content, the online system computing an effect of a placement position of sponsored content on offline conversion rates according to the attribution amount of the sponsored content in the placement position to the offline conversion, the placement position being a position within a web page presented to users of the online system.

* * * * *